US012275622B2

(12) United States Patent
Blank et al.

(10) Patent No.: US 12,275,622 B2
(45) Date of Patent: Apr. 15, 2025

(54) CONTROL UNIT AND METHOD FOR OPERATING A CONVEYING MEANS

(71) Applicant: JOHANNES HUEBNER FABRIK ELEKTRISCHER MASCHINEN GMBH, Giessen (DE)

(72) Inventors: Thomas Blank, Reichshof (DE); Manfred Martis, Wetzlar (DE)

(73) Assignee: JOHANNES HUEBNER FABRIK ELEKTRISCHER MASCHINEN GMBH, Giessen (DE)

( * ) Notice: Subject to any disclaimer, the term of this patent is extended or adjusted under 35 U.S.C. 154(b) by 389 days.

(21) Appl. No.: 17/636,406

(22) PCT Filed: Aug. 10, 2020

(86) PCT No.: PCT/EP2020/072350

§ 371 (c)(1),
(2) Date: Feb. 18, 2022

(87) PCT Pub. No.: WO2021/037530

PCT Pub. Date: Mar. 4, 2021

(65) Prior Publication Data

US 2022/0297985 A1 Sep. 22, 2022

(30) Foreign Application Priority Data

Aug. 23, 2019 (DE) ..................... 10 2019 122 703.8

(51) Int. Cl.
*B66C 13/00* (2006.01)
*B66C 13/16* (2006.01)
(Continued)

(52) U.S. Cl.
CPC .............. *B66C 13/38* (2013.01); *B66C 13/16* (2013.01); *B66C 15/00* (2013.01)

(58) Field of Classification Search
CPC ..... B66C 13/063; B66C 13/085; B66C 13/16; B66C 13/22; B66C 13/40; B66C 13/44; B66C 15/00; B66D 1/40
See application file for complete search history.

(56) References Cited

U.S. PATENT DOCUMENTS 3,886,417 A * 5/1975 Niwa ...................... B66C 13/24 318/7
5,625,262 A 4/1997 Lapota
6,653,804 B1 11/2003 Kureck

FOREIGN PATENT DOCUMENTS

DE 2500357 A1 7/1976
DE 1931322 B2 5/1977
(Continued)

*Primary Examiner* — Emmanuel M Marcelo
(74) *Attorney, Agent, or Firm* — Dickinson Wright PLLC; Andrew D. Dorisio

(57) ABSTRACT

The invention relates to a method for operating a conveyor means, in particular a hoist, a crane, a continuous conveyor or the like, and to a control unit, the conveyor means comprising a drive unit (21) and a control unit (20) for controlling the drive unit, the drive unit comprising at least two drives (43, 44), the drives being controlled by means of a control device (22) of the control unit, a rotary encoder (25, 38) of the control unit being connected shafts (29, 42) of the drive unit of the conveyor means each allocated to the drives and registering a rotation of the shafts, a rotation angle signal and/or a rotational speed signal being transmitted to the control device by means of an encoder device (26, 39) of the corresponding rotary encoder in order to control the drives, the control device determining the corresponding rotational speed of the shafts and comparing it to a referential rotational speed, the control device controlling the drives depending on the comparison.

20 Claims, 2 Drawing Sheets

(51) Int. Cl.
*B66C 13/38* (2006.01)
*B66C 15/00* (2006.01)

(56) References Cited

FOREIGN PATENT DOCUMENTS

| | | | |
|---|---|---|---|
| DE | 2924070 | A1 | 11/1980 |
| DE | 145523 | A1 | 12/1980 |
| DE | 149930 | A5 | 8/1981 |
| DE | 3513773 | A1 | 10/1986 |
| DE | 3835522 | A1 | 5/1990 |
| DE | 4038981 | A1 | 6/1992 |
| DE | 19512103 | A1 | 10/1996 |
| DE | 19956265 | A1 | 6/2001 |
| DE | 10230469 | A1 | 1/2004 |
| DE | 10233873 | A1 | 2/2004 |
| DE | 69817865 | T2 | 7/2004 |
| DE | 10309218 | A1 | 9/2004 |
| DE | 102006043492 | A1 | 3/2008 |
| EP | 0347408 | A1 | 12/1989 |
| EP | 0458994 | A1 | 12/1991 |
| EP | 0841298 | A2 | 5/1998 |
| EP | 3360839 | A1 | 8/2018 |
| JP | H07187569 | A | 7/1995 |
| JP | H11246184 | A | 9/1999 |
| JP | H11292242 | A | 10/1999 |
| JP | 2010202377 | A | 9/2010 |
| JP | 2013027254 | A | 2/2013 |
| JP | 2014174019 | A | 9/2014 |
| JP | 2016147726 | A | 8/2016 |
| KR | 20110032423 | A | 3/2011 |
| WO | 2016161470 | A1 | 10/2016 |

* cited by examiner

State of the Art

CONTROL UNIT AND METHOD FOR OPERATING A CONVEYING MEANS

TECHNICAL FIELD

The invention relates to a control unit for a conveyor means and to a method for operating a conveyor means, in particular a hoist, a crane, a continuous conveyor or the like, the conveyor means comprising a drive unit and a control unit for controlling the drive unit, the drive unit comprising at least two drives, the drives being controlled by means of a control device of the control unit, a rotary encoder of the control unit being connected to shafts of the drive unit of the conveyor means each allocated to the drives and registering a rotation of the shafts, a rotation angle signal and/or a rotational speed signal being transmitted to the control device by means of an encoder device of the corresponding rotary encoder in order to control the drives.

BACKGROUND

Such control units and methods are well known from the state of the art and are essentially used for registering the position and rotational speed of a shaft. A rotary encoder of a control unit comprises at least one shaft which can be coupled with a machine or is directly disposed on a shaft of the machine. Furthermore, the rotary encoder comprises a mechanical, optical or magnetic encoder device or registration element. The encoder device can form an incremental encoder or an absolute encoder, for example. In a mechanical embodiment, the encoder device can be a switch or a counter. The encoder device can obtain signals, such as a rotation angle signal or a rotational speed angle, for a rotation of the shaft. From these signals, a rotation angle position of the shaft or a rotational speed of the shaft is determinable by means of a control device of the control unit to which the rotary encoder is connected via a signal line.

Rotary encoders are used, among other things, in or on conveyor means, such as a hoist having rope hoists, cranes, jibs, crabs, winches or the like, and in or on conveyor belts and are subjected to great loads during operation. A casing of a rotary encoder is therefore generally made of metal, making the rotary encoder comparatively resilient to mechanical and thermal stress. For transmitting a signal of the encoder device to a control device of a conveyor means, the rotary encoder possesses a signal output device, if required, which preprocesses the signal for transmission to the control device, which is required in particular for use in fiber optic cables.

Rotary encoders on conveyor means primarily serve for obtaining a specific operational parameter of the conveyor means, such as a rotational speed of a rope drum or a motor or electric motor for driving the rope drum. Hence, conveyor means are known in which a drive unit having ropes for lifting a bearing load, rope drums, electric motors and a transmission switched therebetween are formed. On a shaft of an electric motor and/or on a shaft of the rope drum, a rotary encoder can be disposed in each instance which transmits a rotation angle signal and/or a rotational speed signal to the control device of the conveyor means in order to control the allocated electric motor. Conveyor means therefore commonly possess several such drives or electric motors, meaning that a number of rotary encoders are installed in the hoist. The control device consequently forms a control unit in conjunction with the rotary encoders, the control unit regulating the drive unit depending on a bearing load. The control device receives information to a rotational speed of the respective drive or a shaft of a power transmission driven by an electric motor from the respective rotary encoder. At a great bearing load, for example, the control device regulates a rotational motor speed of the respective electric motor, such that a certain speed is not exceeded when lifting or lowering a bearing load or a rotational speed at a rope drum is not exceeded. If a bearing load is comparatively small, such as an empty container, the bearing load can be lifted at a higher speed, i.e., at a higher rotational motor speed. The respective electric motors are always regulated separately of one another depending on the respective rotational speed. Accordingly, the regulation of the drive unit by means of the control device is always aimed at adjusting a performance of the drive unit to a bearing load so much that the bearing load can be conveyed as quickly as possible by means of the conveyor means or hoist. Besides such a regulation of drives on a hoist, a control unit can also be provided on other conveyor means, such as a continuous conveyor or a belt conveyor. In this instance as well, a plurality of drives for transporting a load or a working load are regularly used.

In a hoist known from the state of the art, the control device is commonly disposed in a control cabinet of the conveyor means and can be a programmable logic controller (PLC), the control device being programmable via an external programming device, such as a standardized computer. In the programmable logic controller or rather the control device, a processing element is integrated which processes a rotation angle signal and/or a rotational speed signal from rotary encoders of the conveyor means and converts them in such a manner that a control of the drives dependent on the rotational speed becomes possible via the control device. A disadvantage here is that individual programming of the programmable logic controller is always required. This programming of the control device generally requires taking prevailing safety regulations into account so that the thus realized control device must also be individually controlled for safety reasons. Furthermore, a conveyor speed is limited by the regulation of the individual drives having the programmable logic controller or control device.

SUMMARY

The object of the invention at hand is therefore to propose a method for operating a conveyor means and a control unit and a conveyor means by means of each of which the conveyor means can be operated more efficiently.

In the method according to the invention for operating a conveyor means, in particular a hoist, a crane, a continuous conveyor or the like, the conveyor means comprises a drive unit and a control unit for controlling the drive unit, the drive unit comprising at least two drives, the drives being controlled by means of a control device of the control unit, a rotary encoder of the control unit being connected to shafts of the drive unit of the conveyor means, which are each allocated to the drives, and registering a rotation of the shafts, a rotation angle signal and/or a rotational speed signal being transmitted to the control device by means of an encoder device of the corresponding rotary encoder in order to control the drives, the control device determining the corresponding rotational speed of the shaft and comparing it to a referential rotational speed, the control device controlling the drives depending on the comparison.

In the method according to the invention, at least one rotary encoder is consequently provided on each drive or power transmission with one or more shafts on at least one of the shafts, the rotary encoder being used for determining a rotational speed of the shaft of the power transmission and consequently for the drive. The corresponding rotary encoder transmits the rotation angle signal and/or rotational speed signal of the encoder device of the rotary encoder to the control device. For this purpose, the rotary encoder can process the rotation angle signal and/or the rotational speed signal itself and also transmit a rotational speed value or a value containing rotational speed information to the control device. The control device can then determine the corresponding rotational speed of the shaft and thus of the individual drives. The control device further compares the corresponding rotational speeds of the shafts and drives and compares them to a referential rotational speed. The control device can consequently detect a differential rotational speed for a rotational speed of each drive with reference to the referential rotational speed. The control device controls the respective drive depending on the comparison of detected rotational speeds of the drive of the shaft to the referential rotational speed. Thus, it becomes possible to synchronize all drives of the drive unit according to the referential rotational speed. A possible difference in rotational speed between the drives, which can occur when individually regulating each of the drives according to the rotational speeds of the allocated rotary encoder, is thus avoided. Overall, a higher conveyor speed can also be achieved, since the drive with the lowest rotational speed within the drive unit no longer determines a maximal conveyor speed. The reference rotational speed can, for example, be oriented at the drive having the highest rotational speed, meaning that the rotational speed of the remaining drives is adjusted to the highest, possible rotational speed by means of the control device.

Consequently, the control device can determine the referential rotational speed according to a rotation angle signal and/or a rotational speed signal of one of the rotary encoders, the control device being able to regulate each of the drives according to the referential rotational speed. The control device can register all rotational speeds of the shafts or power transmissions via the respectively allocated rotary encoders simultaneously and define the highest rotational speed, for example, as a referential rotational speed according to which the rotational speeds of the remaining drives are each regulated. As a result, all drives can be operated with a mostly coinciding synchronized rotational speed. It is also possible, to prevent a possible slip of the drive unit between the drives, which could lead to performance loss.

It is advantageous if the control device can determine the corresponding acceleration of the shafts and compare it to a referential acceleration, the control device being able to regulate each of the drives depending on the referential acceleration. The control device can determine or regulate the acceleration by means of a rotation angle signal and/or a rotational speed signal in conjunction with a temporal period. Thus, it is also possible to regulate the acceleration of the corresponding shaft(s) of the drive(s) according to the referential acceleration. In this instance as well, the control device can define or select the referential acceleration according to one of the measured accelerations of the shafts. Regulating the drives according to the referential acceleration permits synchronizing the rotational speeds of the drives or shafts even more precisely.

It is particularly advantageous if the control device can register load signals from load sensors of a sensor device of the control unit allocated to the respective drives and compare them to referential load, the control device being able to regulate each of the drives according to the referential load. A load sensor, which detects a working load for this drive or the allocated shaft and transmits a load signal to the control device, can be allocated to each drive or power transmission. In this case, the control device can compare the corresponding load signals to each other and correlate them to a referential load. One of the load signals can also be the referential load. All loads can then be regulated by the control device according to the referential load, for example by adjusting the rotational speed of the respective drive.

In the control device, a range parameter of a rotational speed, an acceleration and/or a load can be stored; the referential rotational speed, the referential acceleration and/or the referential load can be limited by the range parameter. Consequently, it would no longer be required for the control device to consult a rotational speed, an acceleration and/or a load, which had been detected via a rotary encoder and/or a load sensor of a drive or of a power transmission, as a referential rotational speed, referential acceleration and/or a reference load for regulating the drive. The range parameter can be stored in the control device, for example, so that all drives can be regulated with regard to their rotational speed, acceleration and/or load in the scope of the range parameter during operation of the conveyor means. Nevertheless, the respective drives can be synchronized in this instance since the range parameter or range within which the drives are synchronized can be chosen sufficiently close.

By means of the rotary encoder, the load signals can be registered by the load sensors allocated to the drives, the rotary encoders being able to determine a load-dependent variable depending on the rotation angle signal and/or the rotational speed signal and the load signal and to transmit them to the control device in order to control the device. According to this, the merging of the rotation angle signal and/or the rotational speed signal of the encoder device of the rotary encoder with the load signal of the load sensor normally intended to occur within the control device can take place in the rotary encoder. Consequently, each of the rotary encoders receives the load signal of the respectively allocated load sensor and processes these by means of data processing in conjunction with the rotation angle signal and/or the rotational speed signal of the respective rotary encoder to yield the load-dependent variable which can then be transmitted to the control device. The load-dependent variable can be further processed by the control device directly to control the respective drive, without a particular individual programming of the control device being required for merging the corresponding signals. The rotary encoders installed in the conveyor means can be standardized rotary encoders, which merely require a one-off control for safety reasons regarding signal processing or programming. A programmable logic controller of the control device can thus be programmed with significantly less effort. The signal processing in the respective rotary encoder overall permits attaining a faster processing speed of the control unit since the control device no longer has to carry out this signal processing. The load-dependent variable can also be transmitted as a signal to the control device by the respective rotary encoder, the signal differing from the rotation angle signal and/or the rotational speed signal in the respect that information directly concerning the working load is contained in the signal.

The control device can limit a rotational speed of the drives or switch off the drives when exceeding a load. Thus, it can be ensured that a maximally admissible rotational speed, for example a threshold rotational speed, is not exceeded at the conveyor means for a working load to be conveyed. A working load too large for the conveyor means thus cannot be conveyed using the conveyor means.

By means of a plurality of load sensors each allocated to a drive, load signals can be registered for a working point, a rope load and/or a winding load. These load sensors can, for example, be disposed on a rope drum of a hoist or even measure a winding speed from which the winding load can be derived. Furthermore, loading cases can be measured using the load sensors which concern mechanical interference, such as breakage of a shaft, or a movement of a cantilever of the hoist. Thus, it is possible that a plurality of load sensors are disposed on a hoist or conveyor means in order to measure various loading cases.

A load plug gauge or a load measuring cell can be used as a load sensor. If the drive unit or the drives possess ropes, for example, two load signals can be registered per rope in order to achieve a redundancy of the load sensors.

It is particularly advantageous if a load signal is registered by the load sensors, which are allocated to the drives, by means of a safety element of the respective rotary encoder, the safety element being able to determine a load-dependent maximal threshold rotational speed depending on the rotation angle signal and/or the rotational speed signal and the load signal and being able to transmit them to the control device in order to control the drives. Owing to the fact that the respective threshold rotational speed is calculated by the safety element of the rotary encoder, a programming effort and an error proneness of the control device is significantly reduced. The control device can then adopt a value for a maximal threshold rotational speed directly from the rotary encoder and further process this value in order to control the drives. An effort for launching a conveyor means can be significantly reduced by the control device no longer having to be adjusted to specific types of rotation angles or rotational speed signals or to load signals as well as no longer needing to be safety certified since the rotary encoders are capable of processing these signals. Accordingly, the rotary encoders can each be a self-contained rotary encoder system which only requires a one-off safety check.

The safety element can determine a function of the threshold rotational speed from the rotation angle signal and/or the rotational speed signal and the load signal. The mathematical regulated function of the threshold rotational speed can, for example, be adjusted to a performance-specific curve of an electric motor of the drive. The threshold rotational speed can then be determined infinitely variably and in a manner adapted to a possible maximal performance of the electric motor. This can advantageously increase a conveyor speed of the drive or the drive unit.

The safety element can correct a load signal of a load sensor while taking an acceleration of a working load at the conveyor means into account. Hence, the safety element can take the acceleration of a rope, for example, whose dead weight can be relevant for determining the threshold rotational speed, and the acceleration of the working load when lifting or lowering the working load by means of the drive into account. The safety element can also determine a net load and/or a total load. Furthermore, it can be intended for the safety element to calculate sums and differences from individual load values.

The safety element can determine an eccentricity of a working load or a bearing load on a hoist from load signals. If, for example, several load sensors are provided or the drive unit possesses several ropes for lifting a bearing load, a distribution of the load on the rope or the load sensors can be determined. Depending on the type of bearing load, for example a container or a different object having an unevenly distributed load, a larger load can be measured at one rope opposed to a different one. The safety element can then take into account this load distribution and then adjust the threshold rotational speeds of the respective drives of the ropes depending on the largest measured load.

The control device can transfer a status signal containing information on an operating type of the drives to the safety element, the safety element being able to take the status signal into account when determining the load-dependent threshold rotational speed. An operating type can be, for example, lifting or lowering a bearing load, exceeding a threshold load or overload, a slack rope, an empty running or a fast drive of the respective drives. For instance, a load-dependent threshold rotational speed can also be completely disregarded during an empty running if a load derived from a rope weight is particularly low.

The safety element can determine a lifting, a lowering, an overload, a slack rope or an empty running as an operating type of the drive depending on the rotation angle signal and/or the rotational speed signal and/or the load signal and can transmit this information to the control device. According to this, the safety element can determine the operating type itself by evaluating the corresponding signals and deriving a possible operating type therefrom. For this purpose, certain value ranges or signal patterns can be stored in the safety element, which permits determining the operating type via comparison. Provided the control device transmits an operating type to the safety element, a plausibility comparison can be carried in the safety element. If the results do not coincide, the corresponding drive or the entire drive unit can be shut off by the control device, for example.

By means of the rotary encoder, a switch signal of a terminal switch of the sensor device can be registered, the rotary encoder being able to determine a relative position of a drive load on the conveyor means depending on the switch signal, the safety element being able to take into account the switch signal when determining the load-dependent threshold rotational speed. Via terminal switches, the relative position of a crab of a cantilever of a hoist can be determined, for example. Hence, it can also be established that the working load or bearing load is moved at a lower threshold rotational speed in safety-relevant areas, for example, such as when tracks are located below the hoist or the like. Terminal switches also permit determining a possible length of a rope in a specific position of the hoist and to be taken into account when determining the threshold rotational speed.

The safety element can allocate a maximal threshold load to each operating type or relative position. With the corresponding maximal threshold load, the threshold rotational speed dependent thereof can be determined in turn. The maximal threshold load can be defined while in particular taking safety aspects into account and be stored in the safety element for the corresponding operating type or relative position. In this context, it can also be intended that the load signal of a load sensor is not taken into account when the corresponding maximal threshold load is reached.

It is particularly advantageous if the load signal is registered by means of a counter of the rotary encoder, the counter being able to store rotation angle signals and/or the rotational speed signals and the load signals over an operating period, to determine a load-dependent damage value and to transmit it to the control element in order to control the drive. The counter can then store individual or all signals, the load signals, the rotation angle signals and/or the rotational speed signals over the operating period and can be added together. The counter element can detect a sum load or a load collective which corresponds to the load-dependent damage value. Thus, for example, each lifting of a bearing load leads to progressing component fatigue at the hoist, components having to be checked or replaced for safety reasons when a specific number of values or a total moved bearing load has been reached.

The counter can determine a point in time when a drive or other components have become worn from the stored signals. At this point in time, a check or a servicing including exchanging components if required is necessary. The counter can signal an imminent reaching of the point in time or the point in time itself and initiate switching off or reducing the performance of the operation of the drive or the drive unit by transmitting the damage value to the control device.

The load signal can also be registered by means of an evaluation element of the rotary encoder, the evaluation element being able to determine a weight of a working load at the conveyor means from the load signal and to transmit it to the control device. Accordingly, the evaluation element can determine a net weight by load signals of the evaluation element being used for weighing the working load or a bearing load. It is no longer required to use load sensors which serve solely for weighing the bearing load and for determining a load on the components of the conveyor means. As a result, the load sensors otherwise used for weighing are thus no longer required.

It can also be intended for another rotary encoder of the control unit to be connected to another shaft of the drive and to register a rotation of the other shaft, the rotational speed and/or the load signal being registered by means of the other rotary encoder, the other rotary encoder being able to determine another load-dependent variable depending on another rotation angle signal and/or another rotational speed signal and the load signal and to transmit them to the control device in order to control the drive. The drive unit can comprise several rope rolls, electric motors and transmissions which serve to convey an individual working load. The control device receives an up-to-date load-dependent variable from the corresponding rotary encoders, the variable being able to be used by the control device to control the entire drive unit or individual motors and/or drives of the drive unit.

The control unit according to the invention for a conveyor means, in particular a hoist, a crane, a continuous conveyor or the like, comprises a control device and at least two rotary encoders, the rotary encoders being connectable to shafts of a conveyor means, which are allocated to a drive each of a drive unit, in order to register a rotation of the corresponding shaft, the rotary encoder comprising an encoder device for outputting a rotation angle signal and/or a rotational speed signal to the control device in order to control the drive unit, the corresponding rotational speed of the shaft being determinable and comparable to a referential rotational speed by means of the control device, the drives being controllable by means of the control device depending on the comparison. Reference is made to the description of advantages of the method according to the invention for details on the advantages of the control unit according to the invention.

Advantageously, one of the rotary encoders can comprise the control device. In this case, the control unit only requires the one control device which is integrated in one of the rotary encoders. The remaining rotary encoder(s) can be directly connected to the rotary encoder which comprises the control device. The rotation angle signal and/or the rotational speed signal of the remaining rotary encoders can then be directly transmitted to the control device of the one rotary encoder, the control device being able to further process the signals for controlling the drive unit or the individual drives without the control device having to be programmed individually in a specific manner for merging the corresponding signals. The rotary encoders installed in the conveyor means can be standardized rotary encoders which only require a one-off check for safety reasons with respect to signal processing or programming. A programmable logic controller of the control device can be programmed with significantly less effort. Signal processing in the rotary encoder also permits an overall quicker processing speed of the control unit since the control device no longer has to carry out the signal processing. A load-dependent variable can also be transmitted to the control device of the one rotary encoder as a signal by the load sensor, the signal differing from the rotation angle signal and/or the rotational speed signal in the respect that relevant information pertaining to a working load can be directly contained in the signal. All rotary encoders of the control unit can be simply coupled with the control device via a field bus interfaces for exchanging data via a field bus. Generally, it is also possible to dispose the control device separately from a rotary encoder.

The rotary encoder can also comprise a switch output for exceeding or falling below a parametrizable load-dependent output value. The switch output can be equipped with a safety relay or a semiconductor relay. The parametrizable output value can be a rotational speed value, a too high or too low rotational speed value, a rotation angle value or a rotational-speed differential value.

The rotary encoder can be an incremental encoder and/or an absolute encoder. An incremental encoder can be used advantageously, for example, if the rotary encoder is disposed on a drive or on an electric motor of the drive unit. An incremental signal and/or an absolute signal can be advantageously processed further if the rotary encoder is disposed on a rope drum of the drive unit, for example. The encoder device can output these signals parallel to the rotation angle signal and/or the rotational speed signal or the load-dependent variable. The absolute signal can be a signal known as a single-turn signal, referencing a single rotation of the shaft, or a multiturn signal, referencing a plurality of rotations of the shaft. Furthermore, the rotary encoder can have a digital or analog output for an absolute signal or an incremental signal. The analog output can be a power output or voltage output.

The control unit can also comprise four or more rotary encoders. For instance, the control unit can be made up of two incremental encoders and two absolute encoders, which are allocated to two power transmissions or are connected thereto. A number of rotary encoders can, however, be much greater if the conveyor means is a continuous conveyor, such as a belt conveyor, in which many drives are installed.

The conveyor means according to the invention, in particular a hoist, a crane or the like, comprises a control unit according to the invention and a drive unit having at least two electric motors, a transmission and two rope drums.

BRIEF DESCRIPTION OF THE DRAWINGS

In the following, the invention is described in more detail by making reference to the attached drawings.

DETAILED DESCRIPTION

Figure 1:
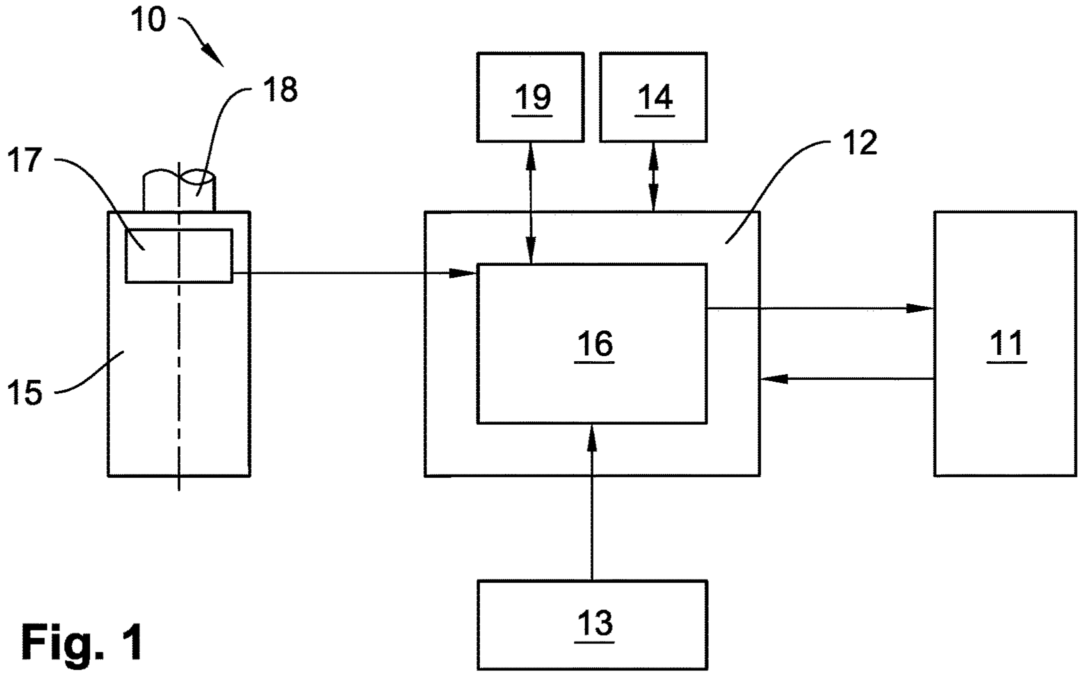
FIG. 1 is a schematic illustration of a configuration of a control unit according to the state of the art.

FIG. 1 shows a control unit 10 according to the state of the art in conjunction with a drive unit 11 which has a drive not illustrated in the drawing. Control unit 10 comprises a control device 12, a sensor device 13 having a load sensor (not illustrated), a programming device 14 and a rotary encoder 15. Further rotary encoders 15, which are connected to drives of drive unit 11, can be connected to control device 12. Control device 12 comprises a processing element 16 which can receive a load signal of a load sensor from sensor device 13. Furthermore, processing element 16 can receive a rotation angle signal and/or a rotational speed signal of an encoder device 17 of rotary encoder 15. Rotary encoder 15 is coupled to drive unit 11 via a shaft 18 in this instance, drive unit 11 being configured to comprise a rope drum (not illustrated) and an electric motor (not illustrated) and a transmission (not illustrated). Control unit 10 and drive unit 11 are part of a hoist or a crane, neither of which is illustrated in this instance.

Processing element 16 calculates a load-dependent variable, such as a maximal threshold rotational speed, from the load signals of sensor device 13 and the rotation angle signals and/or the rotational speed signals of rotary encoders 15, transmits control signals based on the variable to control unit 11 and receives status signals from drive unit 11. Control device 12 is programmable by means of programming device 14, which can be a computer (not further illustrated). Furthermore, control unit 10 comprises a counter 19, which can add load signals of sensor device 13 present in processing device 16 over an operating period and can thus determine a sum load. From this, a damage value is yielded which can be transmitted back to processing device 16 from counter 19, for example in the form of a switch-off signal.

Figure 2:
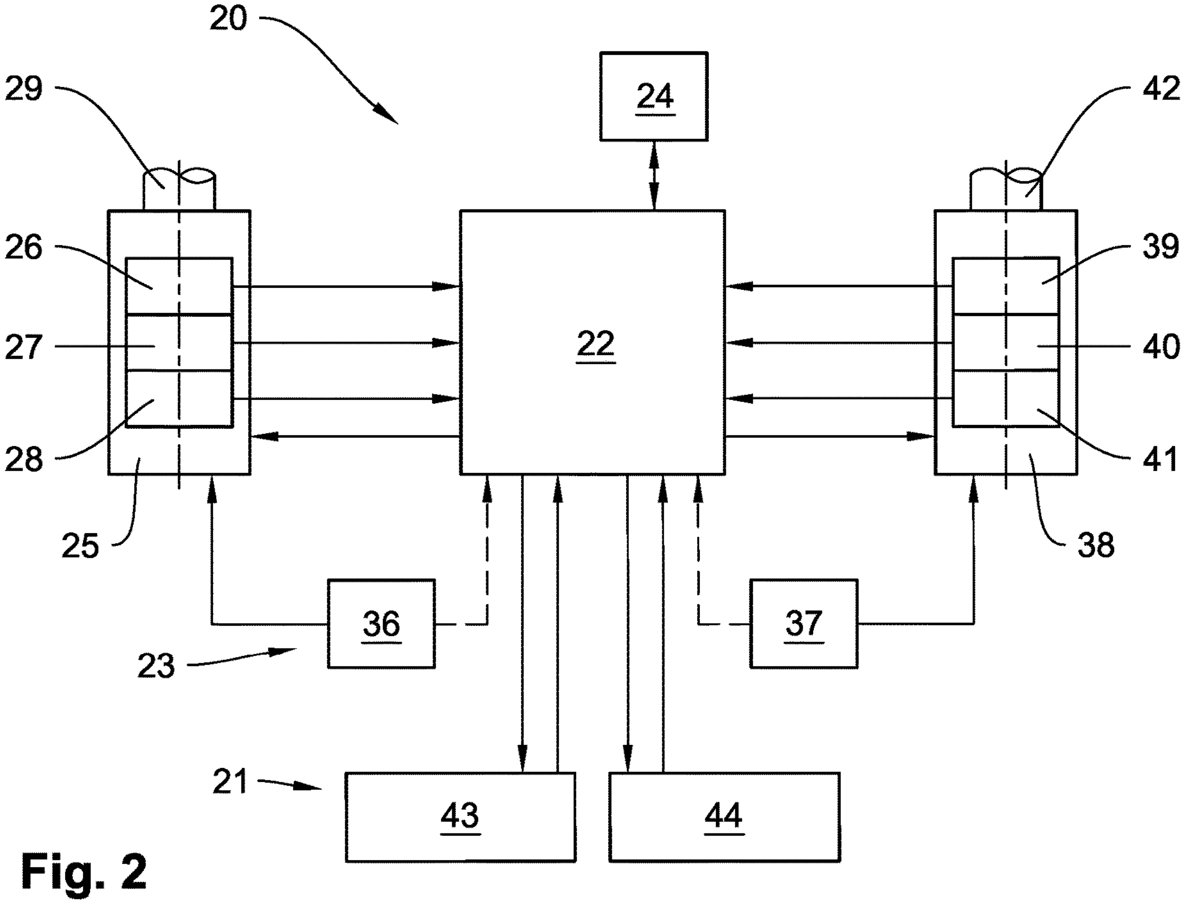
FIG. 2 is a schematic illustration of a configuration of a control unit.

FIG. 2 shows a control unit 20 in conjunction with a drive unit 21 in a simplified illustration. Control unit 20 comprises a control device 22, a sensor device 23 having load sensors 36, 37, a programming device 24 and a rotary encoder 25 and 38. Rotary encoder 25 and 38 themselves each comprise encoder devices 26 and 39, respectively, safety elements 27 and 40, respectively, and counters 28 and 41, respectively, and are coupled with drives 43 and 44 of drive unit 21 via shafts 29 and 42, respectively.

When operating drive unit 21 or drives 43 and 44, rotary encoder 25 coupled with drive 43 and rotary encoder 38 coupled with drive 44 detect a corresponding rotation angle signal and/or a rotational speed signal via corresponding encoder device 26 and 39 and transmit these to control device 22. Furthermore, rotary encoder 25 and 38 each receive a load signal from sensor device 22 or respective load sensor 36 and 37, safety device 27 and 40 each determining a load-dependent variable, for example a maximal threshold rotational speed for each drive 43 and 44, from the respective rotation angle signal and/or the respective rotational speed signal and the respective load signal, the maximal threshold rotational speeds each being transmitted to control device 22 in order to control drive unit 21 or drives 43 and 44.

Furthermore, respective counter 28 and 41 each add up the corresponding load signals within an operating period of drive 43 and 44 and transmit a damage value to control device 22. When reaching a certain damage value, control device 22 can switch off the drive unit, for example. Control device 22 is programmable via programming device 24. Control device 22 can also directly receive and further process load signals from sensor device 23. Control device 22 receives status signals from drive unit 21 or drives 43 and 44 and forwards these to the corresponding rotary encoders 25 and 38. Status signals concern an operating type of drives 43 and 44, such as lifting or lowering a bearing load or a slack rope.

The rotation angle signals and/or the rotational speed signals transmitted by rotary encoders 25 and 38 to control device 22 are further processed by the control device such that a rotational speed of corresponding drive 43 and 44 is determined for each drive 43 and 44. Control device 22 compares the corresponding rotational speed to a referential rotational speed, which can be stored in control device 22 in the form of a range parameter. Furthermore, it can also be intended to define one of the two rotational speeds from control device 22 as the referential rotational speed. It is essential that control device 22 controls drives 43 and 44 depending on a comparison of the corresponding rotational speeds to the referential rotational speed. If, for example, drives 43 and 44 are regulated using control device 22 resulting from rotational speeds of drives 43 and 44 yielded from the corresponding rotation angle signals and/or rotational speed signals of rotary encoder 25 and 38, control device 22 can define the rotational speed allocated to drive 43 as a referential rotational speed. The rotational speeds are now compared to the referential rotational speed, the rotational speed and the referential rotational speed consequently being identical in drive 43. The rotational speed of drive 44 is regulated according to referential rotational speed. Furthermore, it can also be intended for the control device to undertake a supplementary regulation according to an acceleration and/or a load.

Figure 3:
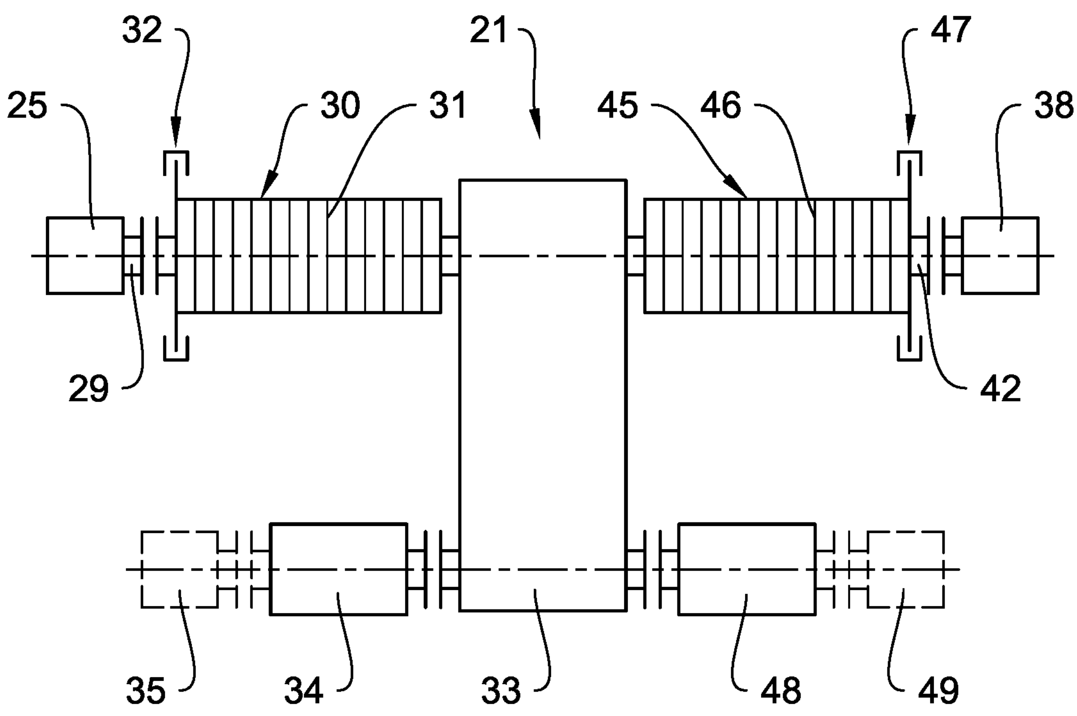
FIG. 3 is a simplified illustration of drive unit.

FIG. 3 is a schematic illustration of drive unit 21 having rotary encoders 25 and 38. Rotary encoders 25 and 38 are coupled with rope drums 30 and 45, respectively, via ropes 31 and 46, respectively, and via shafts 29 and 42, respectively, meaning that rotary encoders 25 and 38 can each detect a rotation angle and/or a rotational speed of rope drums 30 and 45, respectively. Rope drums 30 and 45 each possess a rope break 32 and 47, respectively, and are each coupled to electric motors 34 and 48, respectively, which drive rope drums 40 and 45 via a transmission 33. Optionally, another rotary encoder 35 can be coupled to electric motor 34 and another rotary encoder 49 can be coupled to electric motor 48, with the result that a rotational speed of electric motor 34 and 48 is detectable by means rotary encoders 35 and 49. Rotary encoders 35 and 49 can then be essentially realized like rotary encoders 25 and 38 and be a component of control unit 20.

The invention claimed is:

1. A method for operating a conveyor comprising a drive unit (21) and a control unit (20) for controlling the drive unit, the drive unit comprising at least two drives (43, 44), the at least two drives being controlled by a control device (22) of the control unit, a rotary encoder (25, 35, 38, 49) of the control unit being connected to shafts (29, 42) of the drive unit of the conveyor each allocated to the at least two drives and registering a rotation of the shafts, a rotation angle signal or a rotational speed signal being transmitted to the control device by an encoder device (26, 39) of the corresponding rotary encoder in order to control the drives, the method including the step of determining via the control device a corresponding rotational speed of the shafts and comparing the rotational speed of the shafts to a referential rotational speed, and controlling the drives via the control device depending on the comparison; and wherein the control device (22) defines or selects a referential acceleration according to a measured acceleration of one of the shafts.

2. The method according to claim 1, wherein the control device (22) determines the referential rotational speed according to a rotation angle signal or a rotational speed signal of one of the rotatory encoders (25, 42), the control device regulating each drive depending on the referential rotational speed.

3. The method according to claim 1, wherein the control device (22) determines the corresponding acceleration of the shafts (29, 42) and compares it to a referential acceleration, the control device regulating each drive (43, 44) depending on the referential acceleration.

4. The method according to claim 3, wherein the control device (22) registers a load signal from load sensors (36, 37) of a sensor device (23) of the control unit (20) allocated to the drives (43, 44) and compares it to a referential load, the control device regulating each drive depending on the referential load.

5. The method according to claim 4, wherein a range parameter of a rotational speed, an acceleration or a load is stored in the control device (22), the referential rotational speed, the referential acceleration or the referential load each being limited by the range parameter.

6. The method according to claim 4, wherein the load signals from the load sensor are registered by the rotary encoder (25, 35, 38, 49), the rotary encoders each determining a load-dependent variable depending on the rotation angle signal or the rotational speed signal and transmitting it to the control device (22) in order to control the drives (43, 44).

7. The method according to claim 4, wherein the control device (22) limits a rotational speed of the drives (43, 44) or switches off the drives when exceeding a load.

8. The method according to claim 4, wherein load signals are registered for a working point, a rope load or a winding load by a plurality of load sensors (36, 37) allocated to a drive (43, 44) each.

9. The method according to claim 1, wherein a load signal is registered by load sensors (36, 37), which are allocated to the drives (43, 44), by a safety element (27, 40) of the corresponding rotary encoder (25, 35, 38, 49), the safety element determining a load-dependent maximal threshold rotational speed depending on the rotation angle signal or the rotational speed signal and the load signal and transmitting it to the control device (22) in order to control the drive.

10. The method according to claim 9, wherein the safety element (27, 40) determines a function of the threshold rotational speed from the rotation angle signal or the rotational speed signal and the load signal.

11. The method according to claim 9, wherein that the safety element (27, 40) corrects a load signal of a load sensor (36, 37) while taking an acceleration of a working load at the conveyor into account.

12. The method according to claim 9, wherein the safety element (27, 40) determines a lifting, a lowering, an overload, a slack rope or an empty running as an operating type of the drive (43, 44) depending on the rotation angle signal or the rotational speed signal or the load signal and transmits it to the control device (22).

13. The method according to claim 9, wherein a switch signal of a terminal switch of the sensor device is registered by the rotary encoder (25, 35, 38, 49), the rotary encoder determining a relative position of a working load on the conveyor depending at the switch signal, the safety element (27, 40) taking the switch signal into account when determining the load-dependent threshold rotary speed.

14. The method according to claim 9, wherein the load signal is registered by a counter (28, 41) of the rotary encoder (25, 35, 48, 49), the counter storing the rotation angle signals or the rotational speed signals and the load signals over an operational period, determining a load-dependent damage value and transmitting it to the control device (22) in order to control the drive (43, 44).

15. The method according to claim 9, wherein the load signal is registered by an evaluation device of the rotary encoder (25, 35, 38, 49), the evaluation device determining a weight of a working load at the conveyor from the load signal and transmitting it to the control device (22).

16. A control unit (20) for a conveyor comprising a control device (22) and at least two rotary encoders (25, 35, 38, 49), the rotary encoder being connectable to shafts (29, 42) of a conveyor allocated to a drive (43, 44) each of a drive unit (21) in order to register a rotation of the corresponding shaft, the rotary encoder comprising an encoder device (26, 39) for outputting a rotation angle signal or a rotational speed signal to the control device (22) in order to control the drive unit, wherein the corresponding rotational speed of the shaft is determinable and comparable to a referential rotational speed by the control device, the drives being controllable by the control device depending on the comparison;

wherein the control device (22) defines or selects a referential acceleration according to a measured acceleration of one of the shafts.

17. The control unit according to claim 16, wherein one of the rotary encoders (25, 35, 38, 49) comprises the control device (22).

18. The control unit according to claim 16, wherein the rotary encoder (25, 35, 38, 49) is an incremental encoder or an absolute encoder.

19. The control unit according to claim 16, wherein the control unit (20) comprises four or more rotary encoders (25, 35, 38, 49).

20. A conveyor comprising the control unit (20) according to claim 16 and a drive unit (21) having at least two electric motors (34, 48), a transmission and two rope drums (30, 45).

* * * * *